United States Patent
Yang et al.

(10) Patent No.: US 12,480,689 B2
(45) Date of Patent: Nov. 25, 2025

(54) COMPOUND REFRIGERATION SYSTEM FOR HEAT PIPE OF SUPERGRAVITY CENTRIFUGE

(71) Applicants: ZHEJIANG UNIVERSITY, Hangzhou (CN); ARCHITECTURAL DESIGN AND RESEARCH INSTITUTE OF ZHEJIANG UNIVERSITY CO, LTD, Hangzhou (CN)

(72) Inventors: Yi Yang, Hangzhou (CN); Yalin Wang, Hangzhou (CN); Yinan Guo, Hangzhou (CN); De Ding, Hangzhou (CN); Junxiang Yu, Hangzhou (CN)

(73) Assignees: ZHEJIANG UNIVERSITY, Hangzhou (CN); ARCHITECTURAL DESIGN AND RESEARCH INSTITUTE OF ZHEJIANG UNIVERSITY CO, LTD, Hangzhou (CN)

( * ) Notice: Subject to any disclaimer, the term of this patent is extended or adjusted under 35 U.S.C. 154(b) by 841 days.

(21) Appl. No.: 17/748,582

(22) Filed: May 19, 2022

(65) Prior Publication Data
US 2023/0079187 A1 Mar. 16, 2023

(30) Foreign Application Priority Data
Sep. 10, 2021 (CN) .......................... 202111061653.7

(51) Int. Cl.
*F25B 7/00* (2006.01)
*B04B 15/02* (2006.01)
*F25B 41/40* (2021.01)

(52) U.S. Cl.
CPC ................ *F25B 7/00* (2013.01); *B04B 15/02* (2013.01); *F25B 41/40* (2021.01)

(58) Field of Classification Search
CPC .. F25B 7/00; F25B 41/40; F25B 11/04; F25B 2400/02; B04B 15/02
See application file for complete search history.

(56) References Cited

FOREIGN PATENT DOCUMENTS

| CN | 111298992 A | * | 6/2020 | ............. | B04B 15/02 |
| CN | 211887459 U | * | 11/2020 | ............. | B04B 15/02 |
| CN | 112892892 A | * | 6/2021 | ............. | B04B 15/02 |

OTHER PUBLICATIONS

English translation of Wang et al. (CN 111298992 A). (Year: 2020).*

* cited by examiner

*Primary Examiner* — Miguel A Diaz
(74) *Attorney, Agent, or Firm* — Brooks Kushman P.C.

(57) ABSTRACT

The present application provides a compound refrigeration system for a heat pipe of a supergravity centrifuge. The compound refrigeration system for the heat pipe of the supergravity centrifuge includes a rotor rotating around a vertical axis, an experimental cabin covering outside the rotor, and a corresponding cooling system. The rotor is provided with a shaft part which is in running fit with the experimental cabin. The shaft part is provided with a shaft top end located outside the experimental cabin. The cooling system includes a liquid cooling device and an evaporative cooling device. The liquid cooling device comprises a refrigeration source, and a first cooling medium circulating pipeline communicated with the refrigeration source and thermally coupled with a cabin wall of the experimental cabin. The evaporative cooling device includes a condensation chamber arranged outside the experimental cabin, and a heat pipe radiator thermally coupled with the rotor.

10 Claims, 2 Drawing Sheets

COMPOUND REFRIGERATION SYSTEM FOR HEAT PIPE OF SUPERGRAVITY CENTRIFUGE

CROSS REFERENCE TO RELATED APPLICATION(S)

This patent application claims the benefit and priority of Chinese Patent Application No. 202111061653.7, filed on Sep. 10, 2021, the disclosure of which is incorporated by reference herein in its entirety as part of the present application.

TECHNICAL FIELD

The disclosure relates to the technical field of supergravity, and in particular, to a compound refrigeration system for a heat pipe of a supergravity centrifuge.

BACKGROUND

A basic principle of a supergravity engineering technology is to use a unique flow behavior of a multiphase flow system under a condition of supergravity to strengthen the relative speed and mutual contact between phases, so as to realize an efficient mass and heat transfer process and an efficient chemical reaction process. On the earth, a simple method for realizing a supergravity environment is simulated and implemented by producing centrifugal force through rotation. Such rotating equipment is called a compound refrigeration system for a heat pipe of a supergravity centrifuge.

The compound refrigeration system for the heat pipe of the supergravity centrifuge mainly includes a rotor rotating around a vertical axis and an experimental cabin covering outside the rotor. The rotor is driven to rotate at a high speed through a driving motor, so as to generate huge centrifugal force, thereby meeting a requirement of a supergravity experiment. During the process, the rotation of the rotor drives the air in the experimental cabin to flow to cause mutual friction among between the rotor and surrounding air, and between flowing air and the experimental cabin, thereby producing heat. If this heat is not dissipated in time, it will cause the temperature in the experimental cabin to rise sharply, which endangers the safe operation of the whole experimental device, and has a great impact on the safety performance and the measurement accuracy of electronic elements, such as a measurement sensor. Therefore, a cooling system needs to be designed for the compound refrigeration system for the heat pipe of the supergravity centrifuge.

During the operation of the compound refrigeration system for the heat pipe of the supergravity centrifuge, the rotor rotates at a high speed, and the heating power can reach 5 MW. For example, the speed of a rotor tip relative to the air is the highest, the temperature is higher, and the need for heat radiation is greater. The cooling system of the compound refrigeration system for the heat pipe of the supergravity centrifuge at present generally adopts a static pipeline fixed to the experimental cabin. The static pipeline facilitates direct heat transfer with a cabin wall of the experimental cabin or the air in the experimental cabin, but does not facilitate direct heat transfer and cooling of the rotor rotating at a high speed, so a cooling effect needs to be improved.

SUMMARY

The present application provides a compound refrigeration system for a heat pipe of a supergravity centrifuge, which can improve the cooling capacity, and operates more reliably.

The compound refrigeration system for the heat pipe of the supergravity centrifuge provided by the present application includes a rotor rotating around a vertical axis, an experimental cabin covering outside the rotor, and a corresponding cooling system. The rotor is provided with a shaft part which is in running fit with the experimental cabin. The shaft part is provided with a shaft top end located outside the experimental cabin. The cooling system includes a liquid cooling device and an evaporative cooling device.

The liquid cooling device includes a refrigeration source, and a first cooling medium circulating pipeline communicated with the refrigeration source and thermally coupled with a cabin wall of the experimental cabin.

The evaporative cooling device includes a condensation chamber arranged outside the experimental cabin, and a heat pipe radiator communicated with the condensation chamber and extends into the rotor through the shaft top end to perform heat transfer.

A plurality of optional manners are further provided below, which are not additional limitations to the above-mentioned overall solution, but only further additions or optimizations. On the premise of no technical or logical contradiction, each optional manner may be combined separately for the abovementioned overall solution or the plurality of optional manners may be combined.

Optionally, the liquid cooling device further includes a second cooling medium circulating pipe thermally coupled with the condensation chamber.

Optionally, the condensation chamber is located above the shaft top end to enable condensate in the condensation chamber to flow into the shaft top end by the gravity.

Optionally, the heat pipe radiator is of a non-closed loop structure formed by communicating a plurality of sections of pipelines, and has a radiating end and a heat absorption end. The radiating end extends into the condensation chamber, and the heat absorption end is thermally coupled with the motor. The cooling medium flows in the same section of pipeline in two ways to form a cooling medium circulating pipeline.

Optionally, the rotor is of a symmetrical structure relative to the vertical axis thereof and has a high-temperature end far away from the vertical axis. The heat pipe radiator includes:

a first pipeline, vertically extending in the shaft part, and an upper end of the first pipeline being a radiating end; and a second pipeline, one end of the second pipeline being communicated with a lower end of the first pipeline, and the other end of the second pipeline being a heat absorption end and extending to the high-temperature end.

Optionally, the second pipeline includes:

a vertical section, close to a surface of the high-temperature end, and a lower end of the vertical section being the heat absorption end; and an inclined section, one end of the inclined section being communicated with a bottom end of the first pipeline, and the other end of the inclined section being communicated with an upper end of the vertical section.

Optionally, the upper end of the vertical section is higher than the position of a bottom end of the first pipeline.

Optionally, the cooling system further includes a vacuum pump. The vacuum pump is connected to experimental cabin through a vacuum pipe to adjust the vacuum degree in the experimental cabin.

Optionally, the cooling system further includes a cold storage tank communicated with the first cooling medium circulating pipeline, and used to store a cooling medium produced by the refrigeration source.

Optionally, the first cooling medium circulating pipe penetrates through a side wall of the experimental cabin.

According to the compound refrigeration system for the heat pipe of the supergravity centrifuge of the present application, through mutual cooperation of the liquid cooling device and the evaporative cooling device, the temperature produced when the rotor rotates at a high speed is effectively reduced, which ensures safe and efficient work of the compound refrigeration system for the heat pipe of the supergravity centrifuge.

Figure 1:
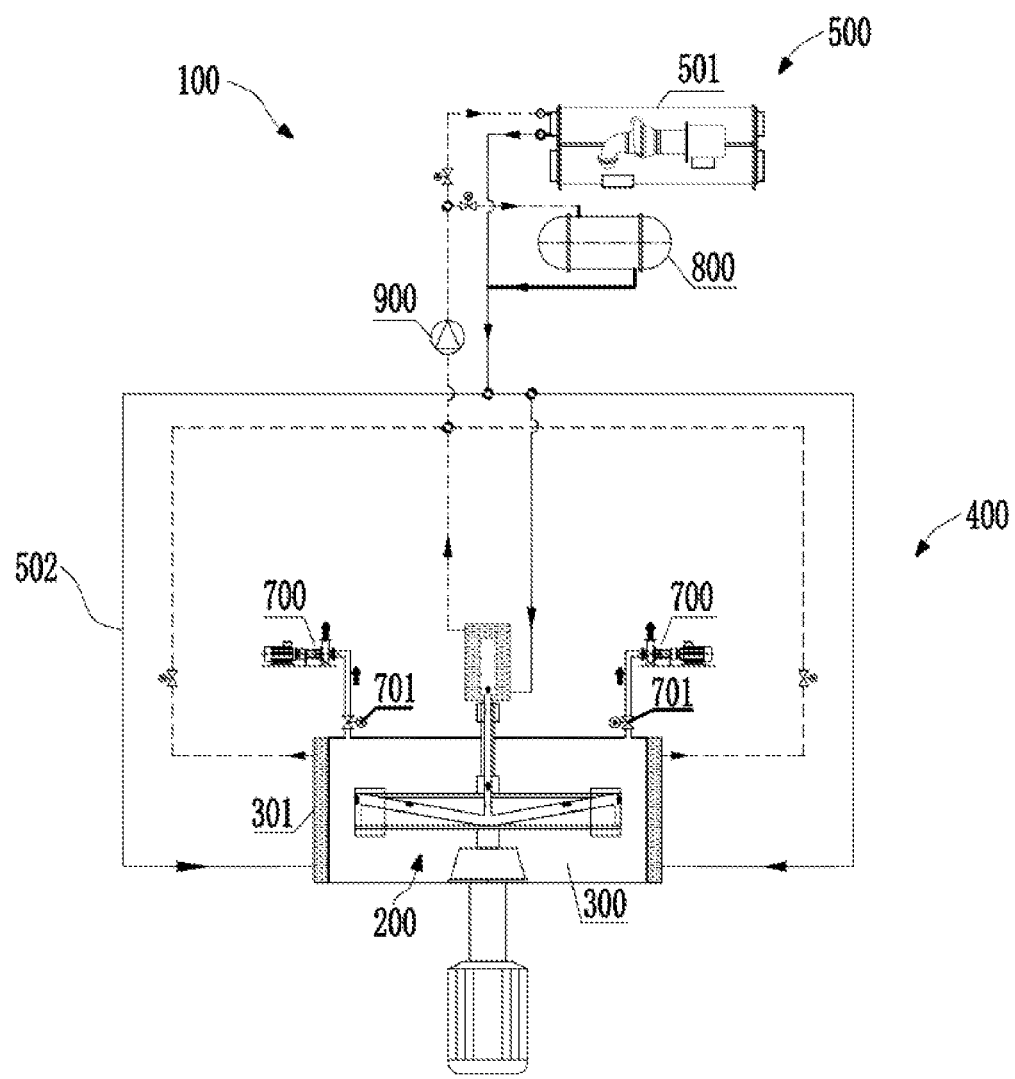
FIG. 1 is a structural schematic diagram of a compound refrigeration system for a heat pipe of a supergravity centrifuge in an embodiment of the present application.
Figure 2:
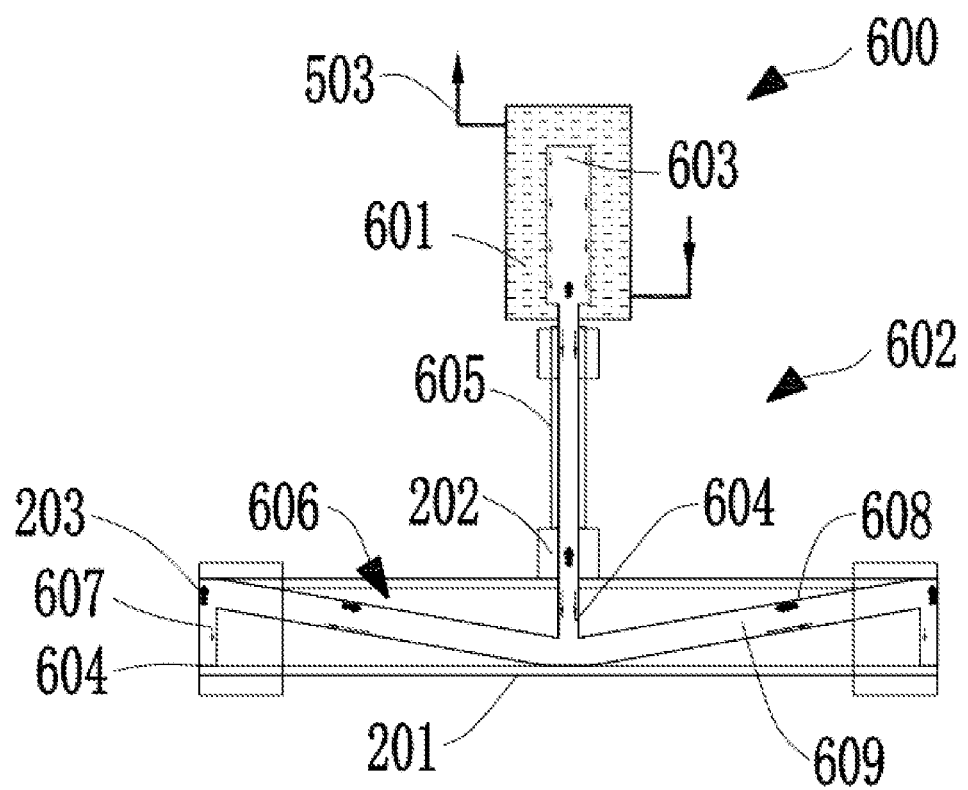
FIG. 2 is a structural schematic diagram of an evaporative cooling device in an embodiment of the present application.

REFERENCE SIGNS IN THE DRAWINGS 100, compound refrigeration system for heat pipe of supergravity centrifuge;
200, rotor; 201, shaft part; 202, shaft top end; 203, high-temperature end;
300, experimental cabin; 301, cabin wall;
400, cooling system;
500, liquid cooling device; 501, refrigeration source; 502, first cooling medium circulating pipeline; 503, second cooling medium circulating pipeline;
600, evaporative cooling device; 601, condensation chamber; 602, heat pipe radiator; 603, radiating end; 604, heat absorption end; 605, first pipeline, 606, second pipeline, 607, vertical section, 608, inclined section, 609, air flow channel;
700, vacuum pump; 701, vacuum valve;
800, cold storage tank; and
900, circulating pump.

DETAILED DESCRIPTION

The technical solutions in the embodiments of the present application are clearly and completely described in the following with reference to the accompanying drawings in the embodiments of the present application. It is apparent that the described embodiments are only a part of the embodiments of the present application, but not all of the embodiments. All other embodiments obtained by a person of ordinary skill in the art based on the embodiments of the present application without creative efforts shall fall within the protection scope of this application.

It should be noted that when a component is referred to as being "connected" to another component, it may be directly connected to another component or there may be an intermediate component. When a component is regarded as being "arranged" on the other component, it may be directly arranged on the other component, or there may be a component therebetween.

Unless otherwise defined, all technical and scientific terms used herein shall have the same meanings as commonly understood by those skilled in the art to which the present application belongs. The terms used herein in the specification of the present application are only used to describe specific embodiments, but are not to limit the present application. The term "and/or" used herein includes any and all combinations of one or more of the associated listed items.

The present application discloses a compound refrigeration system for a heat pipe of a supergravity centrifuge 100. The compound refrigeration system for the heat pipe of the supergravity centrifuge 100 includes a rotor 200 rotating around a vertical axis, an experimental cabin 300 covering outside the rotor 200, and a corresponding cooling system 400. The rotor 200 is provided with a shaft part 201 which is in running fit with the experimental cabin 300. The shaft part 201 is provided with a shaft top end 202 located outside the experimental cabin 300. The cooling system 400 includes a liquid cooling device 500 and an evaporative cooling device 600.

The liquid cooling device 500 includes a refrigeration source 501, and a first cooling medium circulating pipeline 502 communicated with the refrigeration source 501 and thermally coupled with a cabin wall 301 of the experimental cabin 300.

The evaporative cooling device 600 includes a condensation chamber 601 arranged outside the experimental cabin 300, and a heat pipe radiator 602 communicated with the condensation chamber 601 and extends into the rotor 200 through the shaft top end 202 to perform heat transfer.

In the present embodiment, related requirements of a supergravity experiment are met through huge centrifugal force produced by high-speed rotation of the rotor 200. The experimental cabin 300 is used for installing an experimental apparatus or placing an experimental item. When the compound refrigeration system for the heat pipe of the supergravity centrifuge 100 operates, a large amount of heat will be produced by the friction between the rotor 200 rotating at a high speed and flowing air and between the flowing air and the cabin wall 301. The heat produced between the rotor 200 and the cabin wall 301 is absorbed by the first cooling medium circulating pipeline 502 of the liquid cooling device 500, so as to lower the temperature of the compound refrigeration system for the heat pipe of the supergravity centrifuge 100. When the compound refrigeration system for the heat pipe of the supergravity centrifuge 100 operates, a large amount of heat will also be produced in the rotor 200 due to high-speed movement, and the heat in the rotor 200 is absorbed through the heat pipe radiator 602 of the evaporative cooling device 600, which prevents the rotor 200 from affecting a using effect due to over-high temperature, and reduces the centrifugal degree of the compound refrigeration system for the heat pipe of the supergravity centrifuge 100.

The heat is absorbed by the liquid cooling device 500 and the evaporative cooling device 600, which can ensure that each instrument in the compound refrigeration system for the heat pipe of the supergravity centrifuge 100 does not affect the accuracy of the instrument due to the increase of temperature, and meanwhile, enable the compound refrigeration system for the heat pipe of the supergravity centrifuge 100 to operate safely and efficiently.

A connection manner between the liquid cooling device 500 and the condensation chamber 601 is that the liquid cooling device 500 further includes a second cooling medium circulating pipe 503 thermally coupled with condensation chamber 601. A port, entering the condensation chamber 601, of the second cooling medium circulating pipe 503 is lower than the port, exiting the condensation chamber 601, of the second cooling medium circulating pipe 503, so that the periphery of the condensation chamber 601 can be fully filled with a cooling medium flowing out from equipment, such as the refrigeration source 501. Thus, the condensation chamber 601 can be fully cooled. The cooling medium enters the refrigeration source 501 through a circulating pump 900, so as to perform cooling treatment on the cooling medium. The cooling medium after the cooling treatment is conveyed into the second cooling medium circulating pipe 503 again to start a next cycle.

In order to facilitate the flowing of the condensate into the shaft top end 202, the condensation chamber 601 is located above the shaft top end 202 to enable the condensate in the condensation chamber 601 to flow into the shaft top end 202 by the gravity.

The condensate cools the rotor 200 through the heat pipe radiator 602. The heat pipe radiator 602 is of a non-closed loop structure formed by communicating a plurality of sections of pipelines, and has a radiating end 603 and a heat absorption end 604. The radiating end 603 extends into the condensation chamber 601, and the heat absorption end 604 is thermally coupled with the rotor 200. The cooling medium flows in the same section of pipeline in two ways to form a cooling medium circulating pipeline. The cooling medium in the second cooling medium circulating pipe 503 will perform cooling treatment on the condensate in the radiating end 603. The condensate after the cooling treatment flows through the heat absorption end 604 to absorb the heat in the rotor 200 relying on the gravity thereof and the centrifugal force, so as to cool the interior of the rotor 200. The heat pipe radiator 602 is fixed outside the rotor 200, which facilitates the maintenance and replacement of maintenance personnel.

A specific structure of the heat pipe radiator 602 is that the rotor 200 is of a symmetrical structure relative to the vertical axis thereof and has a high-temperature end 203 far away from the vertical axis. The heat pipe radiator 602 includes: a first pipeline 605, vertically extending in the shaft part 201, and an upper end of the first pipeline 605 being a radiating end 603; and a second pipeline 606, one end of the second pipeline 606 being communicated with a lower end of the first pipeline 605, and the other end of the second pipeline 606 being a heat absorption end 604 and extending to the high-temperature end 203 of the rotor 200. As a preferred solution, two rotors 200 are arranged, and are located at two ends of the shaft part 201. When the compound refrigeration system for the heat pipe of the supergravity centrifuge 100 operates, the rotor 200 rotates at a high speed. A bottom of the rotor 200 is almost perpendicular to a bottom surface of the experimental cabin 300. When flowing from the radiating end 603 to the shaft top end 202 through the first pipe 605, the condensate is thrown to the heat absorption end 604 of the second pipeline 606 due to the action of the centrifugal force. The condensate absorbs the heat generated by the friction between the rotor 200 and the flowing air through phase-change heat transfer at the heat absorption end 604, and simultaneously evaporates into gas. The condensate that evaporates into gas returns to the radiating end 603 through a gas flow channel 609 in the heat pipe radiator 602, is cooled into a liquid state through the condensate in the second cooling medium circulating pipe 503 at the radiating end 603, and enters the shaft top end 202 through the first pipeline 605 again to start the next cycle. As a preferred solution, the radiating end 603 may adopt a cylindrical cavity, and the radiating end 603 rotates in the condensation chamber 601 together with the rotor 200. The heat absorption end 604 is fixed to the high-temperature end 203 on the outer side of the rotor 200.

In order to enable the condensate to reach the heat absorption end 604 better through the centrifugal force, the second pipeline 606 includes: a vertical section 607, close to a surface of the high-temperature end 203, and a lower end of the vertical section 607 being the heat absorption end 604; and an inclined section 608, one end of the inclined section being communicated with a bottom end of the first pipeline 605, and the other end of the inclined section being communicated with an upper end of the vertical section 607. The upper end of the vertical section 607 is higher than the position of a bottom end of the first pipeline 605. The inclined section 608 gradually rises from the bottom end of the first pipeline 605, and the vertical section 607 is close to the high-temperature section, so that the condensate can bring heat away through the phase-change heat transfer better.

In order to reduce the resistance during rotation of the rotor 200, the cooling system 400 further includes a vacuum pump 700. The vacuum pump 700 is connected to experimental cabin 300 through a vacuum pipe to adjust the vacuum degree in the experimental cabin 300. When the vacuum degree in the experimental cabin 300 is reduced, the resistance of air to the rotation of the rotor 200 can be greatly reduced, and meanwhile, the resistance between the flowing air and the cabin wall 301 will also be reduced. The vacuum valve 701 is opened, so that the vacuum pump 700 vacuumizes the experimental cabin 300, and the interior of the experimental cabin 300 reaches a certain vacuum degree. The vacuum degree may be determined according to a different value between an actually measured temperature and a temperature required by the experiment in the experimental cabin 300.

In order to guarantee sufficient use of the cooling medium during the operation of the compound refrigeration system for the heat pipe of the supergravity centrifuge 100, the cooling system 400 further includes a cold storage tank 800 communicated with the first cooling medium circulating pipeline 502, and used to store the cooling medium produced by the refrigeration source 501. In order to enable the cooling medium to absorb the heat in the experimental cabin 300 better, the first cooling medium circulating pipeline 502 penetrates through a side wall of the experimental cabin 300. An inlet end of the first cooling medium circulating pipeline 502 at the cabin wall 301 is lower than an outlet end, which can distribute the cooling medium on the periphery of the experimental cabin 300, so that the heat produced by the friction between the flowing air and the cabin wall 301 is effectively absorbed. The cooling medium flowing through the outlet end is conveyed into the refrigeration source 501 for performing cooling treatment through the circulating pump 900, and then a next cycle is performed.

When the compound refrigeration system for the heat pipe of the supergravity centrifuge starts work, the refrigeration source 501 and/or the cold storage tank 800 convey the cooling medium through the first cooling medium circulating pipeline 502 and the second cooling medium circulating pipeline 503. When the cooling medium passing through the first cooling medium circulating pipeline 502 flows through the side wall of the experimental cabin 300, the heat produced between the flowing air and the cabin wall 301 and between the rotor 200 and the cabin wall 301 is absorbed, and the cooling medium after heat absorption is conveyed into the refrigeration source 501 through the circulating pump 900, so as to perform cooling again. Meanwhile, the condensate absorbs the heat produced between the rotor 200 and the flowing air through the heat pipe radiator 602. The condensate after absorbing heat evaporates into gas, and is cooled into a liquid after flowing through a radiating end 603 of the second cooling medium circulating pipeline 503, so as to transfer heat to the second cooling medium circulating pipeline 503. The cooling medium with the temperature rises in the second cooling medium circulating pipeline 503 is also conveyed to the refrigeration source 501 for cooling through a circulating pipe. Meanwhile, the vacuum pump 700 is started to reduce the vacuum degree in the experimental cabin 300 to reduce the heat produced due to the friction of the equipment.

According to the device, the heat in the experimental cabin and the radiating end of a heat pipe is brought away by a refrigerant in the refrigeration source 501 in a direct refrigerating manner in the first cooling medium circulating pipeline, the second cooling medium circulating pipeline 503, and the radiating end 603. At this moment, the refrigeration source 501 is equivalent to a refrigerant compressor and a condensing and heat dissipating device in a refrigeration system. The cold storage tank 800 is a high-pressure refrigerant storage tank. The refrigerant enters the first cooling medium circulating pipeline, the second cooling medium circulating pipeline 503, and the radiating end 603 to perform evaporative refrigeration directly through a throttling device, and then enters the next cycle through the refrigeration source 501.

The technical features of the above described embodiments may be arbitrarily combined. For the sake of brevity of description, all possible combinations of the technical features in the above embodiments are not described. However, as long as there is no contradiction between the combinations of these technical features, all should be considered as the scope of this description. When the technical features in different embodiments are embodied in the same drawings, it can be regarded that the drawings also disclose the combined examples of the various embodiments involved.

The above embodiments are merely illustrative of several implementation manners of the present application with specific and detailed description, and are not to be construed as limitations to the patent scope of the present application. It is to be noted that a number of variations and modifications may be made by those of ordinary skill in the art without departing from the conception of the present application, and all fall within the scope of protection of the present application. Therefore, the scope of protection of the present application should be determined by the appended claims.

What is claimed is:

1. A compound refrigeration system for a heat pipe of a supergravity centrifuge, comprising a rotor rotating around a vertical axis, an experimental cabin covering outside the rotor, and a corresponding cooling system, wherein the rotor is provided with a shaft part which is in running fit with the experimental cabin; the shaft part is provided with a shaft top end located outside the experimental cabin; the cooling system comprises a liquid cooling device and an evaporative cooling device;

the liquid cooling device comprises a refrigeration source, and a first cooling medium circulating pipeline communicated with the refrigeration source and thermally coupled with a cabin wall of the experimental cabin;
the evaporative cooling device comprises a condensation chamber arranged outside the experimental cabin, and a heat pipe radiator thermally coupled with the rotor; a heat absorption end of the heat pipe radiator is fixed to the rotor; and a radiating end of the heat pipe radiator extends into the condensation chamber through the shaft top end.

2. The compound refrigeration system for the heat pipe of the supergravity centrifuge according to claim 1, wherein the liquid cooling device further comprises a second cooling medium circulating pipe thermally coupled with the condensation chamber.

3. The compound refrigeration system for the heat pipe of the supergravity centrifuge according to claim 1, wherein the condensation chamber is located above the shaft top end to enable condensate in the condensation chamber to flow into the shaft top end by the gravity.

4. The compound refrigeration system for the heat pipe of the supergravity centrifuge according to claim 3, wherein the heat pipe radiator is fixed to an outer side of the rotor; and the condensate flows in the heat pipe radiator in two ways to form a further cooling medium circulating pipeline.

5. The compound refrigeration system for the heat pipe of the supergravity centrifuge according to claim 4, wherein the rotor is of a symmetrical structure relative to the vertical axis thereof and has a high-temperature end far away from the vertical axis; the heat pipe radiator comprises:

a first pipeline, vertically extending in the shaft part, and an upper end of the first pipeline being a radiating end; and a second pipeline, one end of the second pipeline being communicated with a lower end of the first pipeline, and the other end of the second pipeline being a heat absorption end and extending to the high-temperature end.

6. The compound refrigeration system for the heat pipe of the supergravity centrifuge according to claim 5, wherein the second pipeline comprises:

a vertical section, close to a surface of the high-temperature end, and a lower end of the vertical section being the heat absorption end; and an inclined section, one end of the inclined section being communicated with a bottom end of the first pipeline, and a second end of the inclined section being communicated with an upper end of the vertical section.

7. The compound refrigeration system for the heat pipe of the supergravity centrifuge according to claim 6, wherein the upper end of the vertical section is higher than the position of a bottom end of the first pipeline.

8. The compound refrigeration system for the heat pipe of the supergravity centrifuge according to claim 1, wherein the cooling system further comprises a vacuum pump; and the vacuum pump is connected to the experimental cabin through a vacuum pipe to adjust a vacuum degree in the experimental cabin.

9. The compound refrigeration system for the heat pipe of the supergravity centrifuge according to claim 2, wherein the cooling system further comprises a cold storage tank communicated with the first cooling medium circulating pipeline, and used to store a cooling medium produced by the refrigeration source.

10. The compound refrigeration system for the heat pipe of the supergravity centrifuge according to claim 1, wherein the first cooling medium circulating pipe penetrates through a side wall of the experimental cabin.

* * * * *